United States Patent
Tachibanada et al.

(10) Patent No.: US 9,856,980 B2
(45) Date of Patent: Jan. 2, 2018

(54) VEHICULAR PARKING LOCK DEVICE

(71) Applicant: HONDA MOTOR CO., LTD., Tokyo (JP)

(72) Inventors: Yuya Tachibanada, Wako (JP); Tetsuya Mochizuki, Wako (JP); Yutaka Ishikawa, Wako (JP); Shunsuke Yoshida, Wako (JP); Tomoaki Mukai, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 15/301,180

(22) PCT Filed: Jan. 26, 2015

(86) PCT No.: PCT/JP2015/051976
§ 371 (c)(1),
(2) Date: Sep. 30, 2016

(87) PCT Pub. No.: WO2015/151561
PCT Pub. Date: Oct. 8, 2015

(65) Prior Publication Data
US 2017/0016535 A1   Jan. 19, 2017

(30) Foreign Application Priority Data

Apr. 1, 2014   (JP) .................................. 2014-075116

(51) Int. Cl.
*B60W 10/18* (2012.01)
*F16H 63/34* (2006.01)
(Continued)

(52) U.S. Cl.
CPC .......... *F16H 63/3483* (2013.01); *B60T 1/005* (2013.01); *B60T 1/062* (2013.01);
(Continued)

(58) Field of Classification Search
CPC .. F16H 63/3483; F16H 63/3425; F16H 61/12; B60T 1/062; B60T 1/005; F16D 63/006; F15B 1/027
See application file for complete search history.

(56) References Cited

U.S. PATENT DOCUMENTS 6,527,670 B1   3/2003   Gierer et al.
8,931,612 B2   1/2015   Bauer et al.
(Continued)

FOREIGN PATENT DOCUMENTS

CN   102678917 A   9/2012
CN   103097779 A   5/2013
(Continued)

OTHER PUBLICATIONS

International Search Report dated Apr. 28, 2015, issued in counterpart International Application No. PCT/JP2015/051976 (2 pages).
(Continued)

*Primary Examiner* — David J Hlavka
(74) *Attorney, Agent, or Firm* — Westerman, Hattori, Daniels & Adrian, LLP

(57) ABSTRACT

In a vehicular parking lock device, supplying a hydraulic pressure from pressure regulation of a line pressure by a linear solenoid valve to a hydraulic brake via a switching valve operated by a first solenoid valve enables a transmission to carry out a shift change. If desired that a parking lock is not operated when an engine stops, the hydraulic pressure stored under pressure in an accumulator is discharged to a drain oil passage by connecting the linear solenoid valve selectively to the drain oil passage by the first solenoid valve, thereby making it possible to prevent the hydraulic pressure stored under pressure in the accumulator from being supplied to a locking oil chamber at the other end of the hydraulic actuator. The first solenoid valve is used for both controlling the operation of the hydraulic brake and
(Continued)

discharge of the hydraulic pressure stored under pressure in the accumulator.

9 Claims, 14 Drawing Sheets

(51) Int. Cl.
| | |
|---|---|
| *F16H 61/12* | (2010.01) |
| *B60T 1/00* | (2006.01) |
| *F15B 1/027* | (2006.01) |
| *B60T 1/06* | (2006.01) |
| *F16D 63/00* | (2006.01) |

(52) U.S. Cl.
CPC ............ *F15B 1/027* (2013.01); *F16D 63/006* (2013.01); *F16H 61/12* (2013.01); *F16H 63/3425* (2013.01)

(56) References Cited

U.S. PATENT DOCUMENTS

| 8,985,294 | B2 | 3/2015 | Schindler et al. |
| 2009/0071275 | A1 | 3/2009 | Yoshioka et al. |
| 2011/0198190 | A1* | 8/2011 | Steinhauser ........ F16H 63/3491 192/219.5 |
| 2014/0123799 | A1* | 5/2014 | Landino ................. B60T 1/062 74/473.11 |
| 2014/0190784 | A1* | 7/2014 | Yokota ................ F16H 63/3416 192/219.5 |
| 2016/0341311 | A1* | 11/2016 | Watanabe ........... F16H 63/3483 |

FOREIGN PATENT DOCUMENTS

| DE | 102004043344 A1 | 4/2006 |
| JP | 4-63750 A | 2/1992 |
| JP | 6-174085 A | 6/1994 |
| JP | 6-221422 A | 8/1994 |
| JP | 2002-533631 A | 10/2002 |
| JP | 2010-210021 | 9/2010 |
| WO | 2009/034766 A1 | 3/2009 |

OTHER PUBLICATIONS

Office Action dated Mar. 30, 2017, issued in counterpart Chinese Patent Application No. 201580011981.2, with English translation. (10 pages).

\* cited by examiner

FIG.6 DURING IDLING STOP CONTROL

FIG.7 WHEN RECOVERING FROM IDLING STOP CONTROL

FIG.9 AUTOMATIC P/L CANCEL (NO. 1)

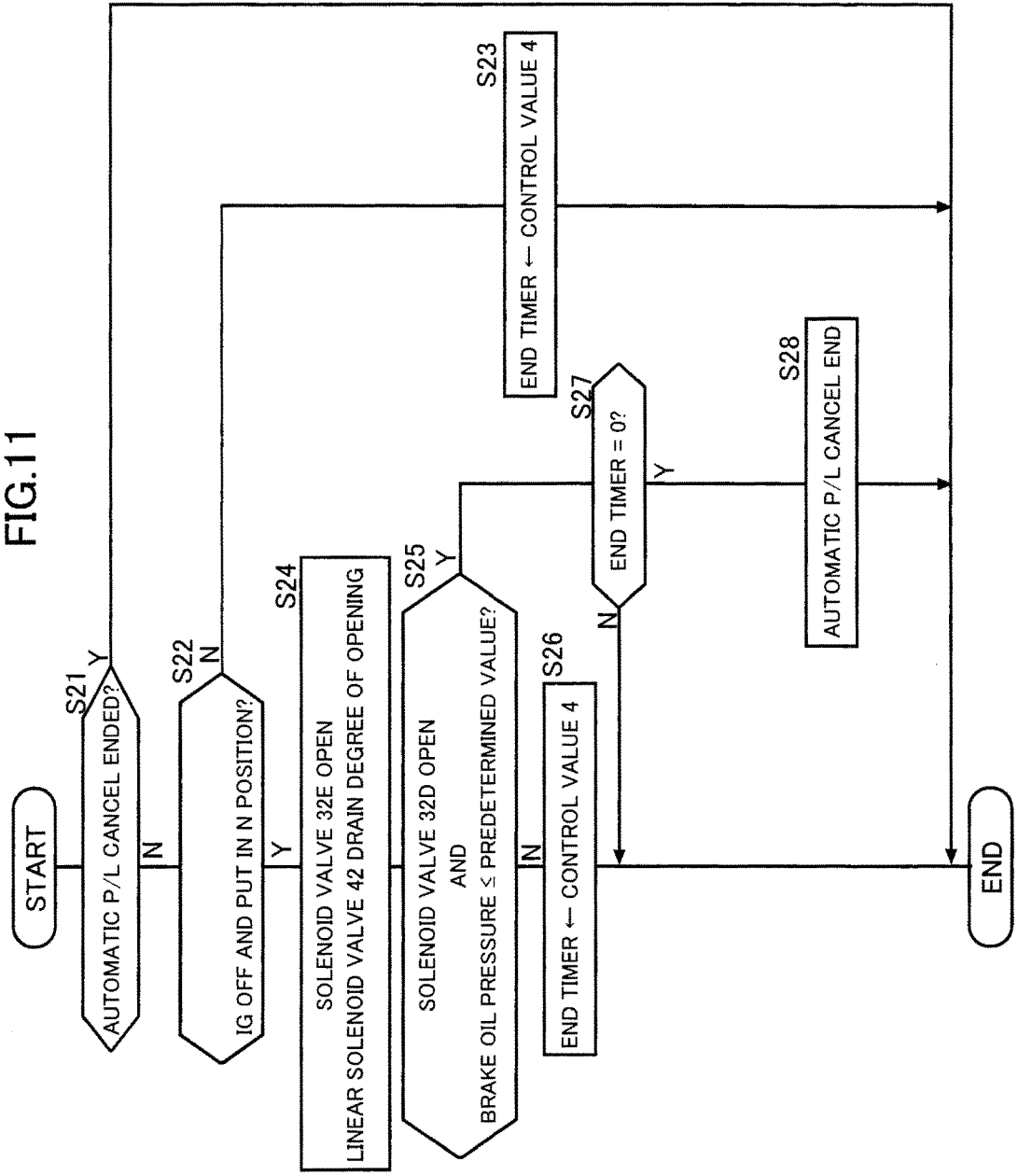

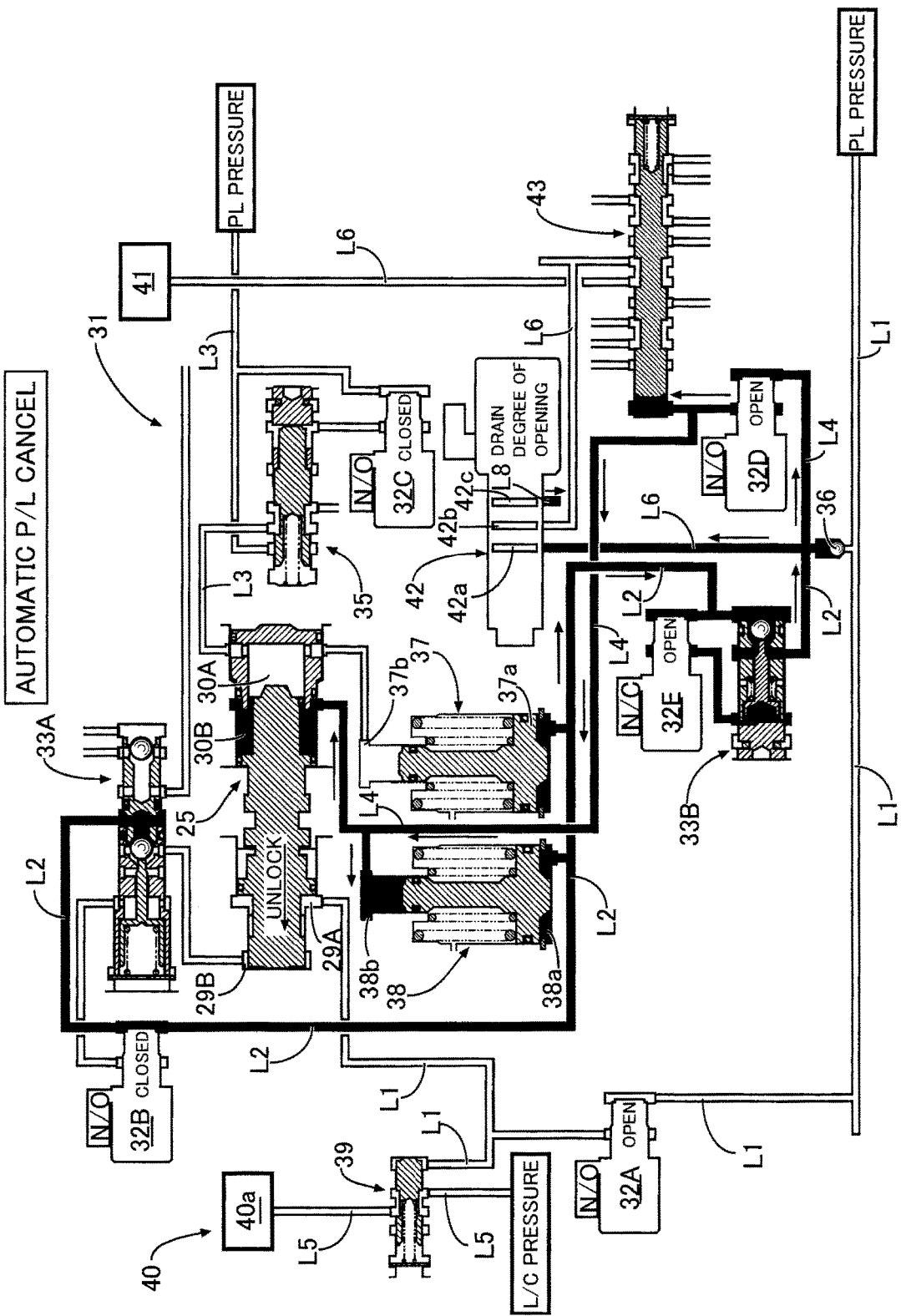

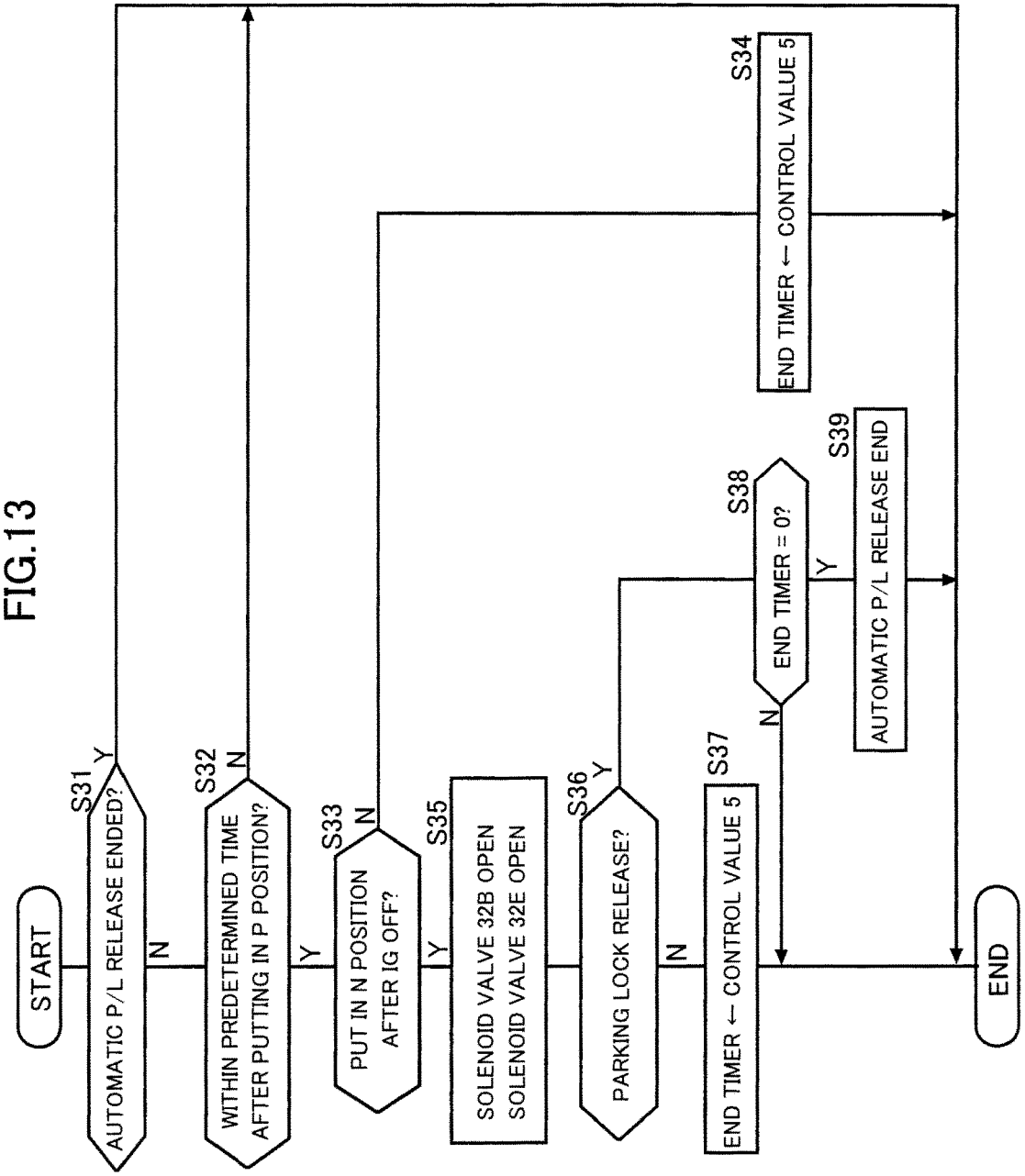

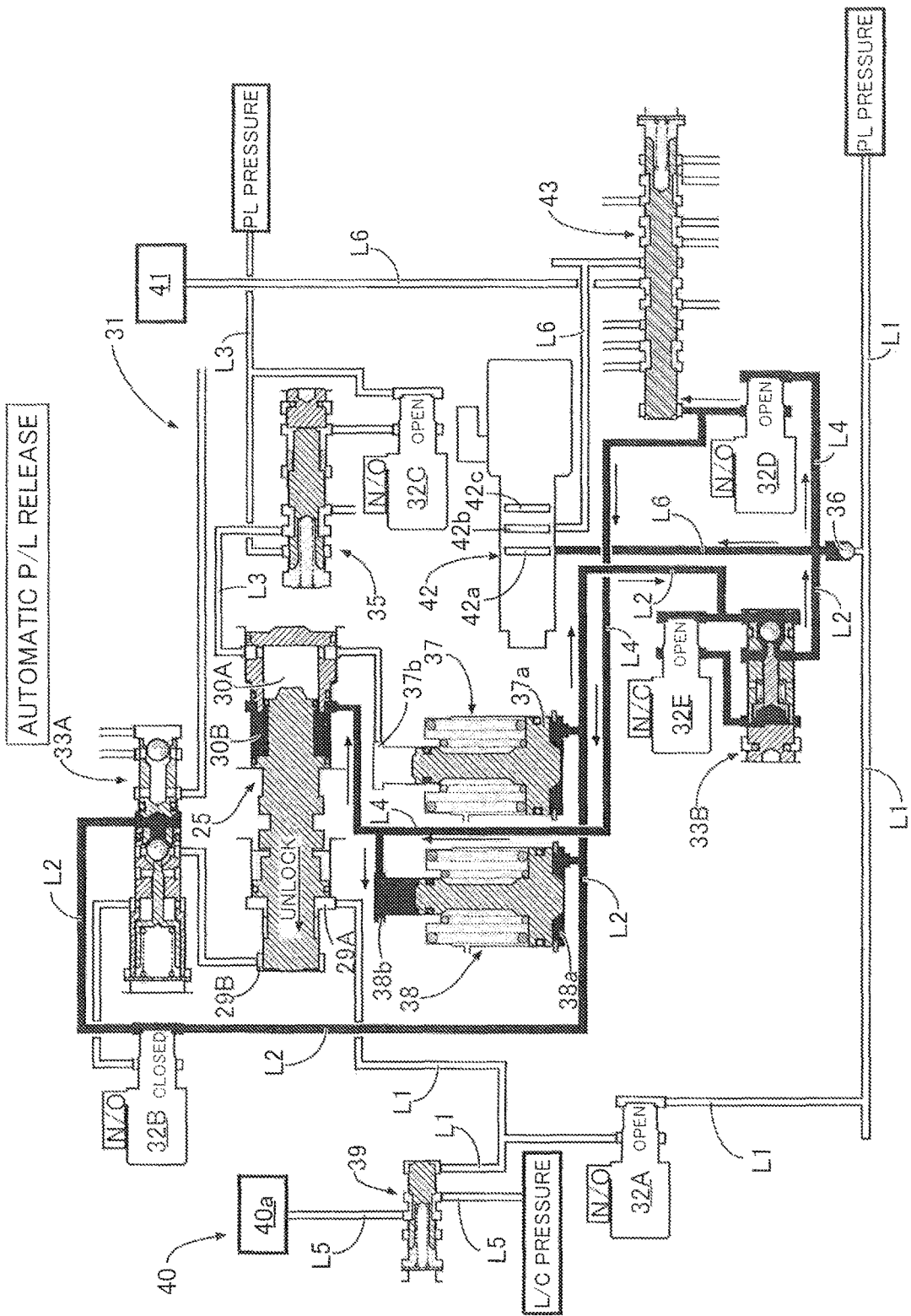
FIG.14 AUTOMATIC P/L RELEASE

VEHICULAR PARKING LOCK DEVICE

TECHNICAL FIELD

The present invention relates to a vehicular parking lock device in which an automatic transmission that includes a plurality of hydraulic engagement devices and changes a speed of a driving force from a drive source and outputs the driving force includes a hydraulic actuator that can restrain rotation of a parking gear connected to a wheel and a hydraulic circuit that controls operation of the hydraulic actuator.

BACKGROUND ART

An arrangement that includes a hydraulic actuator that operates a parking lock device for restraining rotation of an output shaft of an automatic transmission to thus prevent movement of a vehicle and in which a parking lock is operated by supplying hydraulic pressure that has been stored under pressure in an accumulator to the hydraulic actuator after an engine has stopped and the supply of hydraulic pressure to an oil pump is discontinued is known from Patent Document 1 below.

RELATED ART DOCUMENTS

Patent Documents

Patent Document 1: Japanese Patent Application Laid-open No. 4-63750

SUMMARY OF THE INVENTION

Problems to be Solved by the Invention

When the hydraulic actuator is operated by hydraulic pressure stored under pressure in the accumulator after the engine has stopped, it is necessary to provide a solenoid valve between the accumulator and the hydraulic actuator, but since a large number of solenoid valves are already used for the hydraulic circuit of the automatic transmission, it is not desirable to further increase the number of solenoid valves as a consequence of the parking lock device.

The present invention has been accomplished in light of the above circumstances, and it is an object thereof to cut the number of solenoid valves used for a hydraulic circuit of an automatic transmission equipped with a parking lock device.

Means for Solving the Problems

In order to attain the above object, according to a first aspect of the present invention, there is provided a vehicular parking lock device in which an automatic transmission that comprises a plurality of hydraulic engagement devices and changes a speed of a driving force from a drive source and outputs the driving force includes a hydraulic actuator that can restrain rotation of a parking gear connected to a wheel and a hydraulic circuit that controls operation of the hydraulic actuator, wherein the hydraulic circuit comprises a normally open first solenoid valve that supplies a line pressure from a hydraulic pressure supply source to an unlocking oil chamber at one end of the hydraulic actuator in order to drive the hydraulic actuator to a parking lock release position, an accumulator in which a pressure is stored by the line pressure, a normally open second solenoid valve that supplies a hydraulic pressure from the accumulator to a locking oil chamber at the other end of the hydraulic actuator in order to drive the hydraulic actuator to a parking lock operation position, a linear solenoid valve that is connected to the hydraulic pressure supply source and the accumulator and regulates the line pressure, and a switching valve that selectively connects the linear solenoid valve to any one of the plurality of hydraulic engagement devices or a drain oil passage, the switching valve being operated by the first solenoid valve.

Further, according to a second aspect of the present invention, in addition to the first aspect, the unlocking oil chamber is connected to a back chamber of the accumulator.

Furthermore, according to a third aspect of the present invention, in addition to the first of second aspect, when a driver stops the drive source after carrying out a parking lock release operation, the linear solenoid valve is opened, and the switching valve is operated by the first solenoid valve to thus connect the linear solenoid valve to the drain oil passage.

Moreover, according to a fourth aspect of the present invention, in addition to any one of the first to third aspects, the drive source is an engine that is subjected to the idling stop control and there is provided a third solenoid valve disposed between the accumulator and the linear solenoid valve, and the third solenoid valve connects the accumulator to the linear solenoid valve when idling stop control is carried out and when a driver carries out a parking lock release operation after stopping the drive source.

Further, according to a fifth aspect of the present invention, in addition to the fourth aspect, when the driver stops the drive source after carrying out a parking lock release operation, the third solenoid valve and the linear solenoid valve are opened, and the first solenoid valve is opened and closed at a predetermined time interval.

A second locking oil chamber 29B of an embodiment corresponds to the locking oil chamber of the present invention, a second unlocking oil chamber 30B of the embodiment corresponds to the unlocking oil chamber of the present invention, solenoid valves 32B, 32D, and 32E of the embodiment correspond to the second solenoid valve, the first solenoid valve, and the third solenoid valve of the present invention respectively, a first accumulator 37 and a second accumulator 38 of the embodiment correspond to the accumulator of the present invention, a hydraulic brake 41 of the embodiment corresponds to the hydraulic engagement device of the present invention, and a brake cut valve 43 of the embodiment corresponds to the switching valve of the present invention.

Effects of the Invention

In accordance with the first aspect of the present invention, the automatic transmission, which includes the plurality of hydraulic engagement devices and changes the speed of the driving force from the drive source and outputs it, includes the hydraulic actuator, which can restrain the rotation of the parking gear connected to a wheel, and the hydraulic circuit, which controls the operation of the hydraulic actuator.

Since when line pressure is supplied from the hydraulic pressure supply source to the unlocking oil chamber at one end of the hydraulic actuator via the normally open first solenoid valve the parking lock is released, and when the hydraulic pressure is supplied from the accumulator to the locking oil chamber at the other end of the hydraulic actuator via the second solenoid valve the parking lock is operated, when the drive source stops, the supply of line pressure is discontinued, and the power supply is cut off, the normally open second solenoid valve opens and the parking lock operates automatically.

Since there are provided the linear solenoid valve connected to the hydraulic pressure supply source and the accumulator and regulates the line pressure, and the switching valve selectively connecting the linear solenoid valve to any one of the plurality of hydraulic engagement devices or the drain oil passage, and the switching valve is operated by the first solenoid valve, supplying the hydraulic pressure from pressure regulation of the line pressure by the linear solenoid valve to any one of the plurality of hydraulic engagement devices via the switching valve enables the transmission to carry out a shift change. If it is desired that the parking lock is not operated when the drive source stops, the hydraulic pressure stored under pressure in the accumulator is discharged to the drain oil passage by connecting the linear solenoid valve selectively to the drain oil passage by the first solenoid valve, thereby making it possible to prevent the hydraulic pressure stored under pressure in the accumulator from being supplied to the locking oil chamber at the other end of the hydraulic actuator to thus prevent the parking lock from operating. Since the first solenoid valve is used for both controlling the operation of any one of the plurality of hydraulic engagement devices and discharge of the hydraulic pressure stored under pressure in the accumulator, the total number of solenoid valves can be decreased, thereby cutting the number of components of the hydraulic circuit.

Furthermore, in accordance with the second aspect of the present invention, since the unlocking oil chamber is connected to the back chamber of the accumulator, discharge of the hydraulic pressure stored under pressure in the accumulator can be promoted by the hydraulic pressure of the unlocking oil chamber.

Moreover, in accordance with the third aspect of the present invention, since when the driver stops the drive source after carrying out a parking lock release operation, the linear solenoid valve is opened, and the switching valve is operated by the first solenoid valve to thus connect the linear solenoid valve to the drain oil passage, it is possible to discharge the hydraulic pressure stored under pressure in the accumulator from the drain oil passage, thus disabling operation of the parking lock.

Furthermore, in accordance with the fourth aspect of the present invention, since the drive source is an engine that is subjected to idling stop control, and the accumulator is connected to the linear solenoid valve via the third solenoid valve when idling stop control is carried out even if the engine stops due to idling stop control and the supply of line pressure is discontinued, supplying the hydraulic pressure stored under pressure in the accumulator to any one of the plurality of hydraulic engagement devices when recovering from idling stop control enables the vehicle to start without delay.

When the driver carries out a parking lock release operation after the drive source has stopped, since the hydraulic pressure stored under pressure in the accumulator is discharged via the third solenoid valve to thus disable operation of the parking lock, it is possible to use the third solenoid valve for both disabling operation of the parking lock and recovering from idling stop control, thereby simplifying the structure of the hydraulic circuit.

Moreover, in accordance with the fifth aspect of the present invention, since when the driver stops the drive source after carrying out a parking, lock release operation, the third solenoid valve and the linear solenoid valve are opened, and the first solenoid valve is opened and closed at a predetermined time interval, the operation of connecting any one of the plurality of hydraulic engagement devices alternately to the accumulator and the drain oil passage to thus supply the hydraulic pressure stored under pressure in the accumulator to the hydraulic engagement device and then discharge the hydraulic pressure of the hydraulic engagement device from the drain oil passage is repeated, thereby enabling the hydraulic pressure stored under pressure in the accumulator to be discharged from the drain oil passage.

BRIEF DESCRIPTION OF DRAWINGS

FIG. 11 is a flowchart showing a second procedure for canceling automatic parking lock. (first embodiment)

FIG. 12 is a diagram for explaining the operation of canceling automatic parking lock by the second procedure. (first embodiment)

FIG. 13 is a flowchart showing the procedure for releasing automatic parking lock. (first embodiment)

FIG. 14 is a diagram for explaining the operation of releasing automatic parking lock. (first embodiment)

EXPLANATION OF REFERENCE NUMERALS AND SYMBOLS

12 Parking gear
25 Hydraulic actuator
29B Second locking oil chamber (locking oil chamber)
30B Second unlocking oil chamber (unlocking oil chamber)
31 Hydraulic circuit
32B Solenoid valve (second solenoid valve)
32D Solenoid valve (first solenoid valve)
32E Solenoid valve (third solenoid valve)
37 First accumulator (accumulator)
38 Second accumulator (accumulator)
38b Back chamber
41 Hydraulic brake (hydraulic engagement device)
42 Linear solenoid valve
43 Brake cut valve (switching valve)
L7 Drain oil passage

MODE FOR CARRYING OUT THE INVENTION

An embodiment of the present invention is explained below by reference to FIG. 1 to FIG. 14.

First Embodiment

Figure 1:
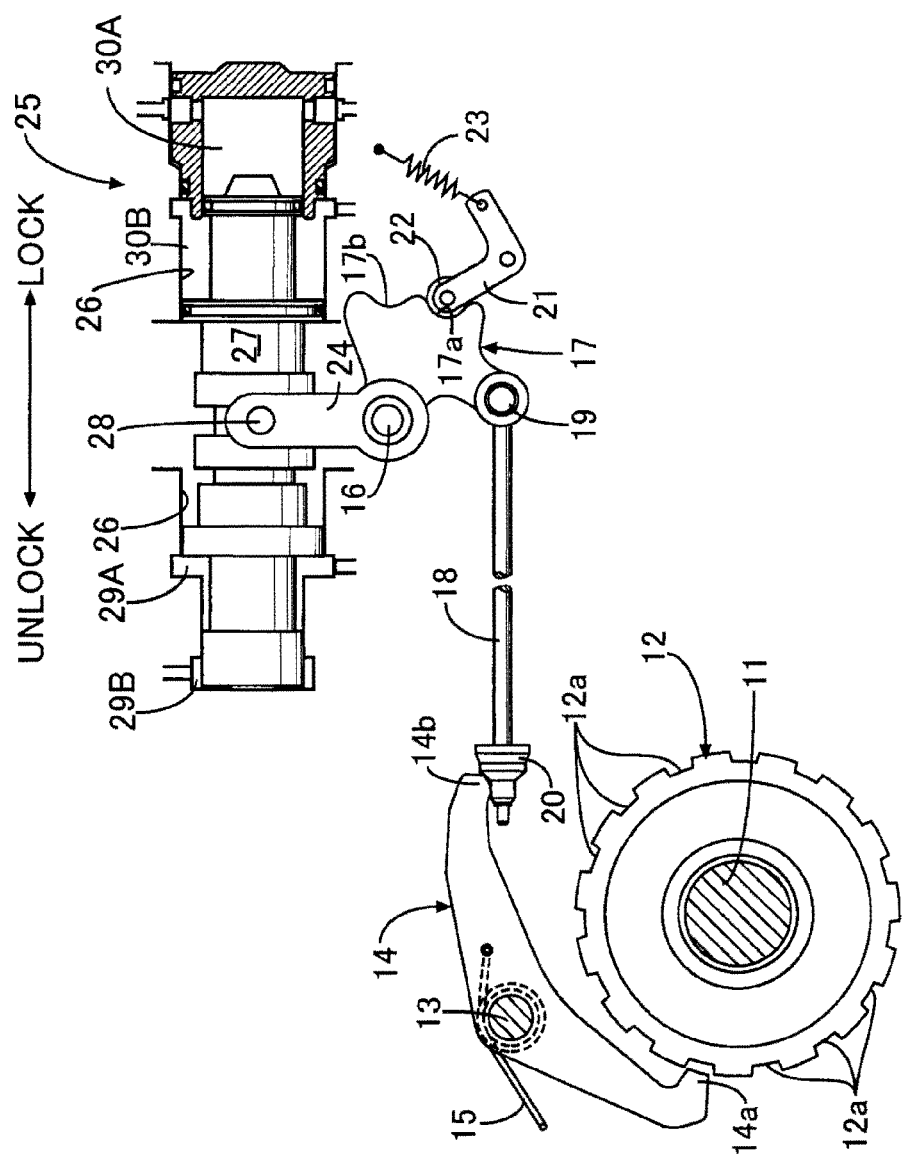
FIG. 1 is a diagram showing the structure of a parking lock device. (first embodiment)

The structure of a parking lock device is now explained by reference to FIG. 1.

A parking gear 12 is fixed to a gear shaft 11 of an automatic transmission, and a latching claw 14a provided at one end of a parking pawl 14 pivotably supported on a support shaft 13 is urged by a spring 15 in a direction in which it disengages from tooth grooves 12a of the parking gear 12. One end of a parking rod 18 is pivotably supported, via a pin 19, on a detent plate 17 pivotably supported on a support shaft 16, and a cone-shaped cam 20 provided at the other end of the parking rod 18 abuts against a cam follower 14b provided at the other end of the parking pawl 14. A detent roller 22 provided at one end of a swingable arm 21 is urged by a spring 23 in a direction in which it engages with either one of two recess portions 17a and 17b of the detent plate 17. A link 24 pivotably supported on the support shaft 16 and swinging integrally with the detent plate 17 is connected to a hydraulic actuator 25.

The hydraulic actuator 25 includes a piston 27 slidably fitted into a cylinder 26, and the link 24 is connected to the piston 27 via a pin 28. Formed on the left end side of the cylinder 26 are a first locking oil chamber 29A and a second locking oil chamber 29B for driving the piston 27 in a direction (rightward) in which parking lock is operated, and formed on the right end side of the cylinder 26 are a first unlocking oil chamber 30A and a second unlocking oil chamber 30B for driving the piston 27 in a direction (leftward) in which parking lock is released.

When a hydraulic pressure is supplied to the first locking oil chamber 29A and the second locking oil chamber 29B, the piston 27 moves rightward, the movement of the piston 27 pushes up the cam follower 14b of the parking pawl 14 via the link 24, the detent plate 17, the parking rod 18, and the cam 20, the parking pawl 14 swings against the resilient force of the spring 15 to make the latching claw 14a engage with one of the tooth grooves 12a of the parking gear 12, and parking lock is operated to thus suppress movement of the vehicle. In the operated state of parking lock, the detent roller 22 engages with the recess portion 17b of the detent plate 17, thus maintaining the state in a stable manner.

On the other hand, when hydraulic pressure is supplied to the first unlocking oil chamber 30A and the second unlocking oil chamber 30B, the piston 27 moves leftward, the latching claw 14a of the parking pawl 14 disengages from the tooth groove 12a of the parking gear 12, and parking lock is released to thus enable the vehicle to move. In the released state of parking lock, the detent roller 22 engages with the recess portion 17a of the detent plate 17, thus maintaining the state in a stable manner.

Figure 2:
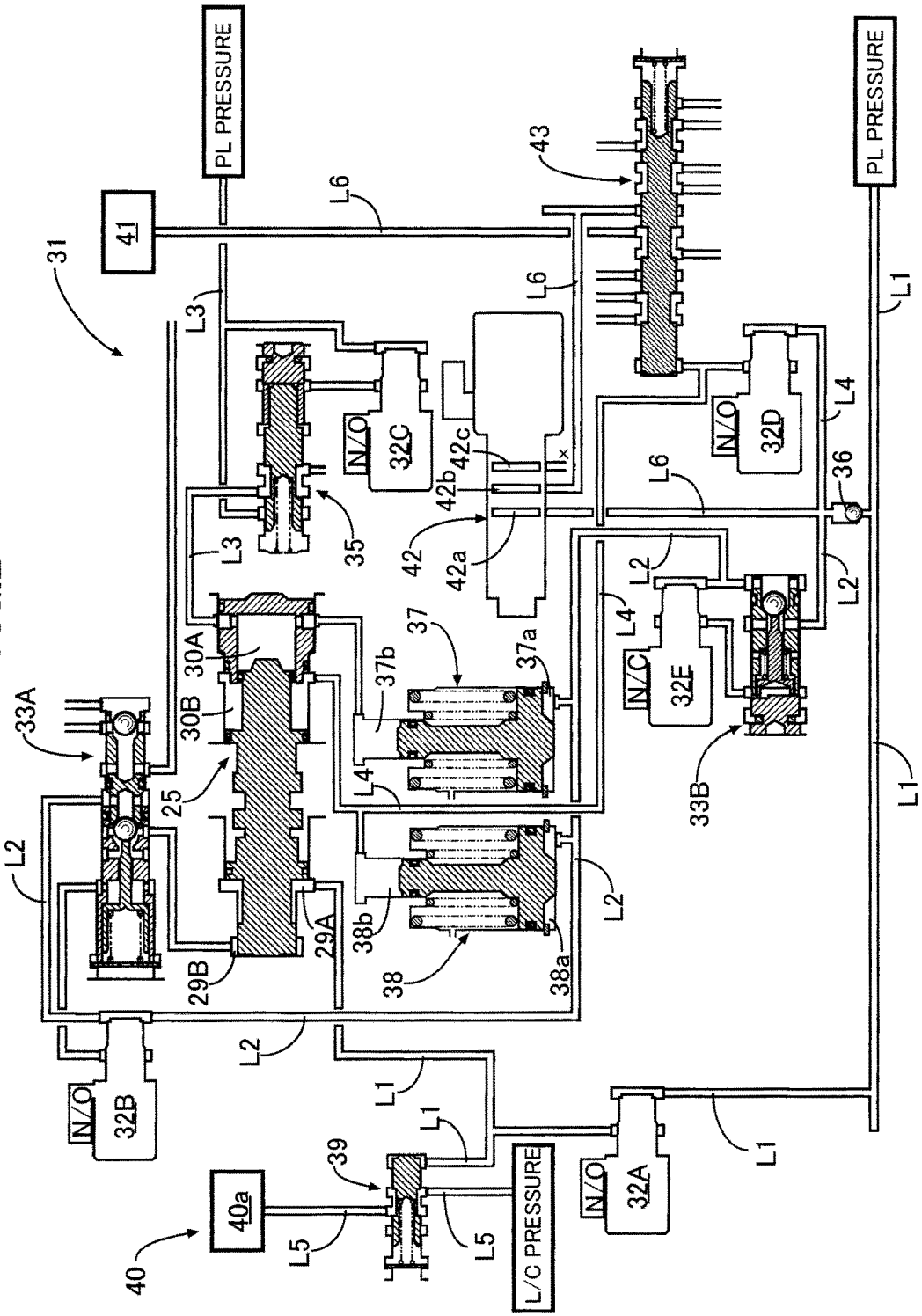
FIG. 2 is a hydraulic circuit diagram of the parking lock device, (first embodiment)

A hydraulic circuit 31 for controlling the operation of the hydraulic actuator 25 is now explained by reference to FIG. 2.

The hydraulic circuit 31 includes an ON/OFF type solenoid valve 32A that supplies to the first locking oil chamber 29A of the hydraulic actuator 25 a line pressure supplied to an oil passage L1 from a hydraulic pump, which is not illustrated, forming the hydraulic pressure supply source of the present invention, and an ON/OFF type solenoid valve 32B that supplies to the second locking oil chamber 29B of the hydraulic actuator 25 a line pressure of an oil passage L2 connected to the downstream side of the oil passage L1 via a check valve 36. By being open the solenoid valve 32A supplies the line pressure directly to the first locking oil chamber 29A, but by being open the solenoid valve 32B opens a first ball valve 33A. The solenoid valve 32A and the solenoid valve 32B are both of a normally open type.

Furthermore, the hydraulic circuit 31 includes an ON/OFF type solenoid valve 32C that supplies a line pressure of an oil passage L3 to the first unlocking oil chamber 30A of the hydraulic actuator 25, and an ON/OFF type solenoid valve 32D that supplies a line pressure of an oil passage L4 on the downstream of the check valve 36 to the second unlocking oil chamber 30B of the hydraulic actuator 25. By being open the solenoid valve 32D supplies the line pressure directly to the second unlocking oil chamber 30B, but by being open the solenoid valve 32C moves a spool of a parking inhibit valve 35 leftward to thus supply the line pressure to the first unlocking oil chamber 30A and by being closed it moves the spool rightward to thus drain the line pressure of the first unlocking oil chamber 30A. The solenoid valve 32C and the solenoid valve 32D are both of a normally open type.

Connected to the oil passage L2 between the check valve 36 and the solenoid valve 32B are a pressure storage chamber 37a of a first accumulator 37 and a pressure storage chamber 38a of a second accumulator 38, a back chamber 37b of the first accumulator 37 communicating with the first unlocking oil chamber 30A, and a back chamber 38b of the second accumulator 38 communicating with the second unlocking oil chamber 30B. Disposed between the check valve 36 and the first accumulator 37 and second accumulator 38 is a second ball valve 33B that is opened and closed by an ON/OFF type solenoid valve 32E. By being open the solenoid valve 32E increases the flow rate of oil by opening the second ball valve 33B. The solenoid valve 32E is of a normally closed type.

A lockup clutch shift valve 39 is connected to the oil passage L1 on the downstream of the solenoid valve 32A, and the lockup clutch pressure of an oil passage L5 is supplied to a lockup clutch 40a of a torque converter 40, which is a starting mechanism, via the lockup clutch shift valve 39.

Furthermore, a hydraulic brake 41, which is a hydraulic engagement device for shift change, is connected to an oil passage L6 on the downstream side of the check valve 36, and a linear solenoid valve 42 and a brake cut valve 43 are disposed in the oil passage L6. The brake cut valve 43 is driven to open and close by the solenoid valve 32D. The linear solenoid valve 42 includes an in port 42a, an out port 42b, and a drain port 42c, and it is thereby possible to regulate the hydraulic pressure inputted via the in port 42a and output it via the out port 42b or to drain via the drain port 42c the hydraulic pressure inputted via the in port 42a.

The operation of the embodiment of the present invention having the above arrangement is now explained.

Figure 3:
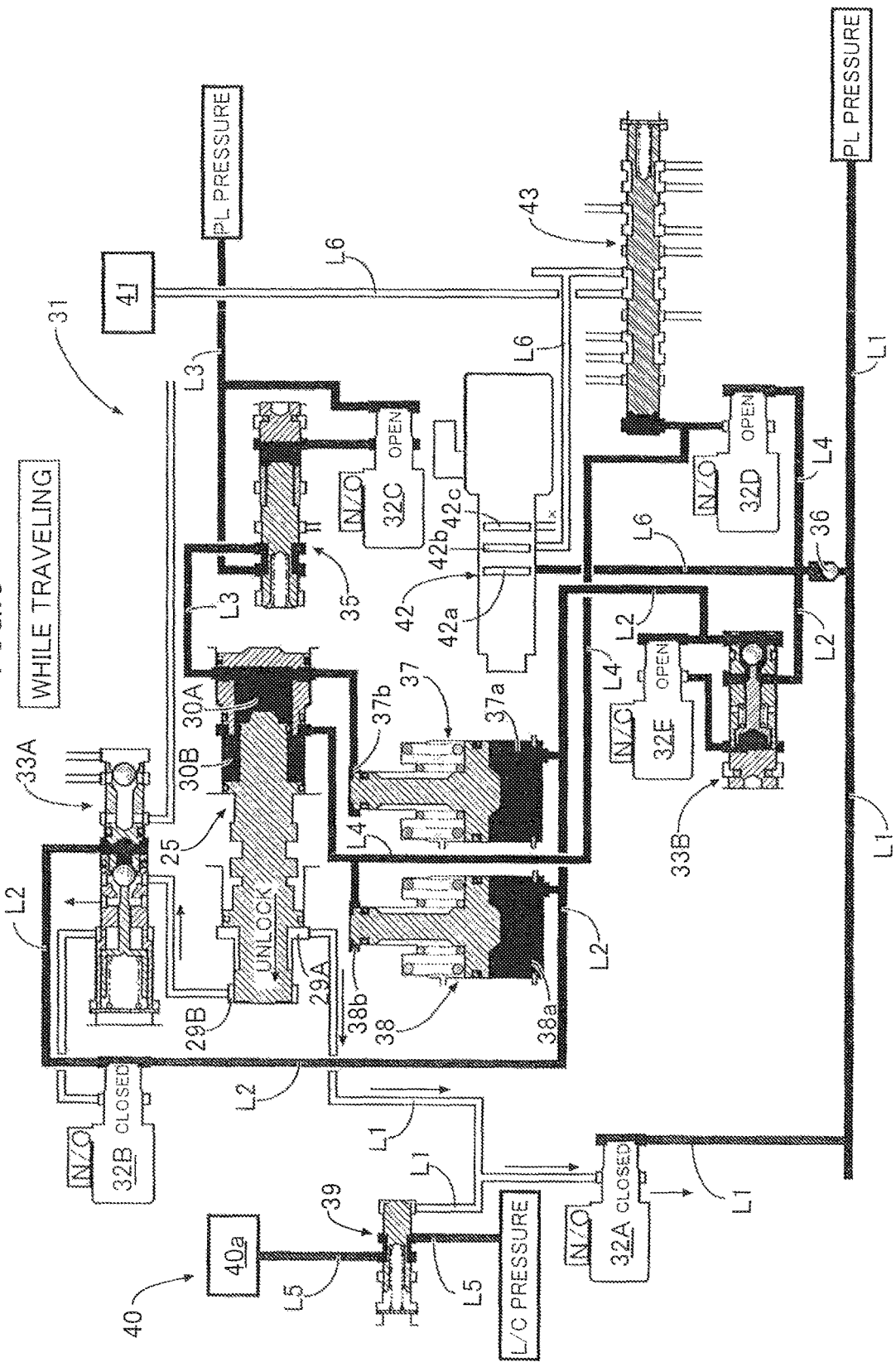
FIG. 3 is a diagram for explaining the operation when running, in a D range or an R range (parking lock release). (first embodiment)

As shown in FIG. 3, when the shift lever is operated to a D range or an R range and the vehicle is traveling in a predetermined gear position, the line pressure generated by the hydraulic pump driven by the engine is transmitted to the oil passage L1 and the oil passage L3, and the hydraulic pressure of the oil passage L1 passes through the check valve 36 and is transmitted to the oil passage L2, the oil passage L4, and the oil passage L6. When the normally closed solenoid valve 32E is energized and opened, the second ball valve 33B is opened in response thereto, the line pressure is supplied to the oil passage L2, and the hydraulic pressure is stored under pressure in the pressure storage chambers 37*a* and 38*a* of the first accumulator 37 and the second accumulator 38.

The normally open solenoid valve 32C and solenoid valve 32D are de-energized and open, the spool of the parking inhibit valve 35 moves leftward due to the solenoid valve 32C being opened, the line pressure of the oil passage L3 is thus transmitted to the first unlocking oil chamber 30A of the hydraulic actuator 25 via the parking inhibit valve 35, and due to the solenoid valve 32D being open the line pressure of the oil passage L4 is transmitted to the second unlocking oil chamber 30B of the hydraulic actuator 25.

On the other hand, the normally open solenoid valve 32A and solenoid valve 32B are energized and close; due to the solenoid valve 32A being closed the oil of the first locking oil chamber 29A of the hydraulic actuator 25 is drained from the solenoid valve 32A via the arrowed path, due to the solenoid valve 32B being closed the first ball valve 33A closes, and the oil of the second locking oil chamber 29B of the hydraulic actuator 25 is thereby drained from the first ball valve 33A via the arrowed path. As a result, the piston 27 of the hydraulic actuator 25 moves leftward and releases the parking lock.

Although the flow rate of oil that can pass through the solenoid valve 32B is relatively small, since the flow rate of oil that can pass through the first ball valve 33A opened and closed by the solenoid valve 32B is relatively large, due to the first ball valve 33A being present therebetween the operating responsiveness of the hydraulic actuator 25 can be enhanced.

As described above, when the vehicle is traveling, due to the solenoid valve 32A and the solenoid valve 32B being closed and the solenoid valve 32C and the solenoid valve 32D being open, the hydraulic actuator 25 is operated to an unlock position, thus enabling the parking lock to be released. In this arrangement, since the hydraulic actuator 25 includes two locking oil chambers, that is, the first locking oil chamber 29A and the second locking oil chamber 29B, and two unlocking oil chambers, that is, the first unlocking oil chamber 30A and the second unlocking oil chamber 30B, even if one of the solenoid valve 32C and the solenoid valve 32D seizes to a valve-closed state and hydraulic pressure is not supplied to the first unlocking oil chamber 30A or the second unlocking oil chamber 30B, or even if one of the solenoid valve 32A and the solenoid valve 32B seizes to a valve-open state and hydraulic pressure is supplied to the first locking oil chamber 29A or the second locking oil chamber 29B, the hydraulic actuator 25 can be operated to an unlock position without problems, thus ensuring that there is redundancy.

The solenoid valve 32C opens at a first predetermined gear position, the solenoid valve 32D opens at a second predetermined gear position, and the first predetermined gear position and the second predetermined gear position partially overlap each other. Therefore, there is a case in which the line pressure is supplied only to the first unlocking oil chamber 30A according to a gear position that is established at that time, a case in which the line pressure is supplied only to the second unlocking oil chamber 30B, and a case in which the line pressure is supplied to both the first unlocking oil chamber 30A and the second unlocking oil chamber 30B; in any of these cases the piston 27 of the hydraulic actuator 25 moves leftward to thus release the parking lock, and there are no problems. Since the line pressure is supplied to both the first unlocking oil chamber 30A and the second unlocking oil chamber 30B at the overlapping gear position, even if the solenoid valve 32C or the solenoid valve 32D malfunctions and the supply of line pressure is discontinued, the parking lock is retained in an operation released state, thus enhancing the redundancy.

Figure 4:
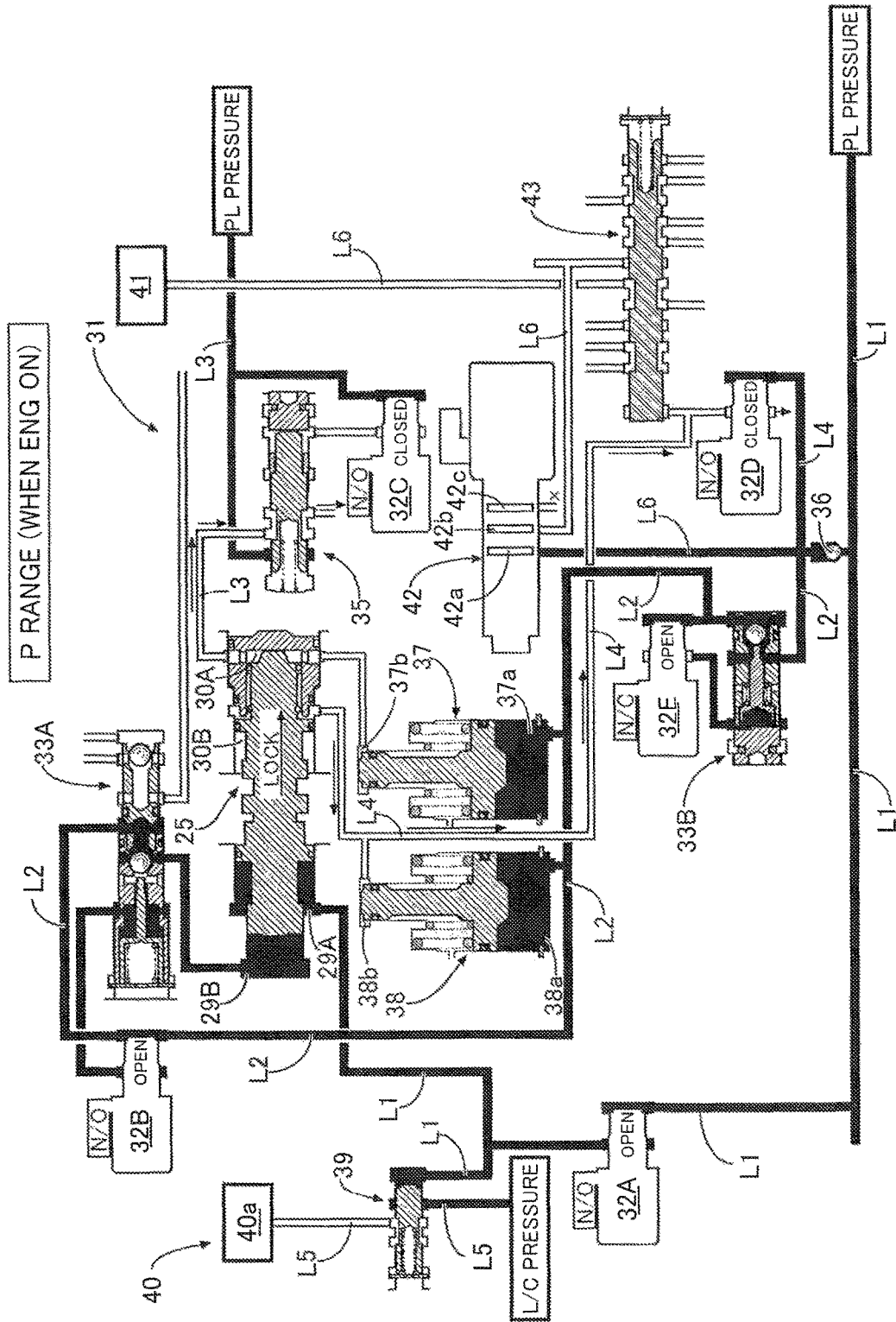
FIG. 4 is a diagram for explaining the operation when parking in a P range (engine ON) (parking lock operation). (first embodiment)

As shown in FIG. 4, when the vehicle stops with the shift lever operated to a P range while the engine is running, the solenoid valve 32A and the solenoid valve 32B are de-energized and open, and the solenoid valve 32C and the solenoid valve 32D are energized and close. Due to the solenoid valve 32A being open the line pressure of the oil passage L1 is transmitted to the first locking oil chamber 29A of the hydraulic actuator 25, and due to the solenoid valve 32B being open the first ball valve 33A opens and the line pressure of the oil passage L2 is transmitted to the second locking oil chamber 29B of the hydraulic actuator 25.

On the other hand, due to the solenoid valve 32C being closed, the oil of the first unlocking oil chamber 30A of the hydraulic actuator 25 is drained via the arrowed path from the parking inhibit valve 35, and due to the solenoid valve 32D being closed the oil of the second unlocking oil chamber 30B of the hydraulic actuator 25 is drained from the solenoid valve 32D via the arrowed path. As a result, the piston 27 of the hydraulic actuator 25 moves rightward to thus operate the parking lock.

As described above, when the shift lever is put into the P range while the engine is running, the solenoid valve 32A and the solenoid valve 32B are opened, the solenoid valve 32C and the solenoid valve 32D are closed, and the hydraulic actuator 25 can be operated to a lock position. In this arrangement, since the hydraulic actuator 25 includes two locking oil chambers, that is, the first locking oil chamber 29A and the second locking oil chamber 29B, and two unlocking oil chambers, that is, the first unlocking oil chamber 30A and the second unlocking oil chamber 30B, even if one of the solenoid valve 32C and the solenoid valve 32D seizes to a valve-open state and hydraulic pressure is supplied to the first unlocking oil chamber 30A or the second unlocking oil chamber 30B, or even if one of the solenoid valve 32A and the solenoid valve 32B seizes to a valve-closed state and no hydraulic pressure is supplied to the first locking oil chamber 29A and the second locking oil chamber 29B, the hydraulic actuator 25 is operated to a lock position without problems, thus ensuring that there is redundancy.

Figure 5:
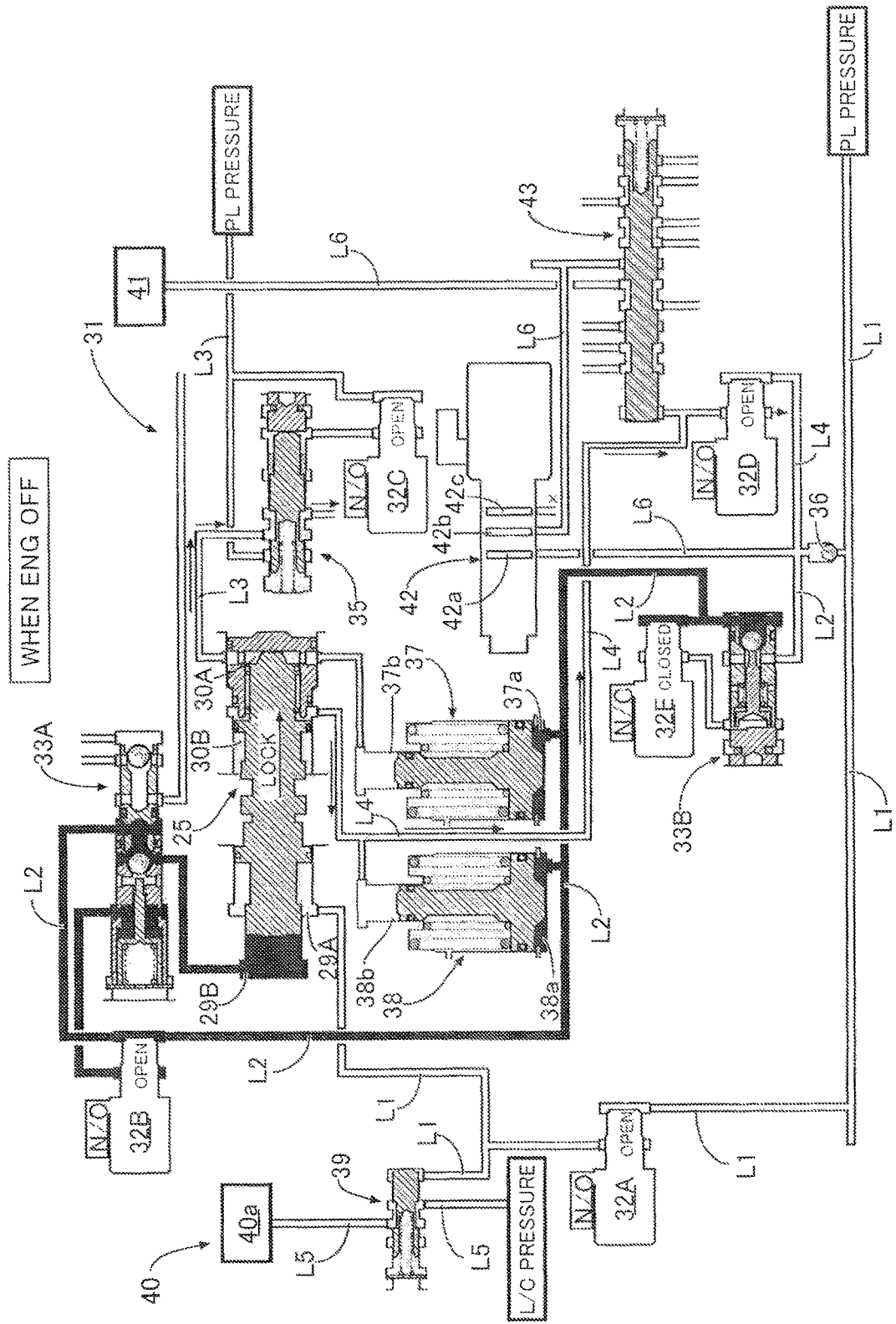
FIG. 5 is a diagram for explaining the operation when an engine is OFF (parking lock operation). (first embodiment)

As shown in FIG. 5, when the shift lever is operated to the P range and the ignition is turned OFF, the engine stops and the line pressure thereby disappears, but in accordance with the present embodiment the parking lock device can be operated without problems by the hydraulic pressure stored under pressure in the first accumulator 37 and the second accumulator 38.

That is, due to the ignition being turned OFF the normally open solenoid valve 32A, solenoid valve 32B, solenoid valve 32C, and solenoid valve 32D are all de-energized and open, and the normally closed solenoid valve 32E is de-energized and closed. Even if the line pressure disappears, due to the solenoid valve 32E being closed the second ball valve 33B closes, and the hydraulic pressure stored under pressure in the first accumulator 37 and the second accumulator 38 is retained without leakage.

Due to the solenoid valve 32B being open the hydraulic pressure of the first accumulator 37 and of the second accumulator 38 is transmitted to the second locking oil chamber 29B of the hydraulic actuator 25 via the opened first ball valve 33A, whereas due to the solenoid valve 32C being open the oil of the first unlocking oil chamber 30A of the hydraulic actuator 25 is drained from the parking inhibit valve 35 via the arrowed path, and due to the solenoid valve 32D being open the oil of the second unlocking oil chamber 30B of the hydraulic actuator 25 is drained from the solenoid valve 32D via the arrowed path. As a result, the piston 27 of the hydraulic actuator 25 moves rightward to thus operate the parking lock.

As described above, even if the line pressure disappears due to the shift lever being operated to the P range and the ignition being turned OFF, the parking lock device can be operated without problems by the hydraulic pressure stored under pressure in the first accumulator 37 and the second accumulator 38.

Figure 6:
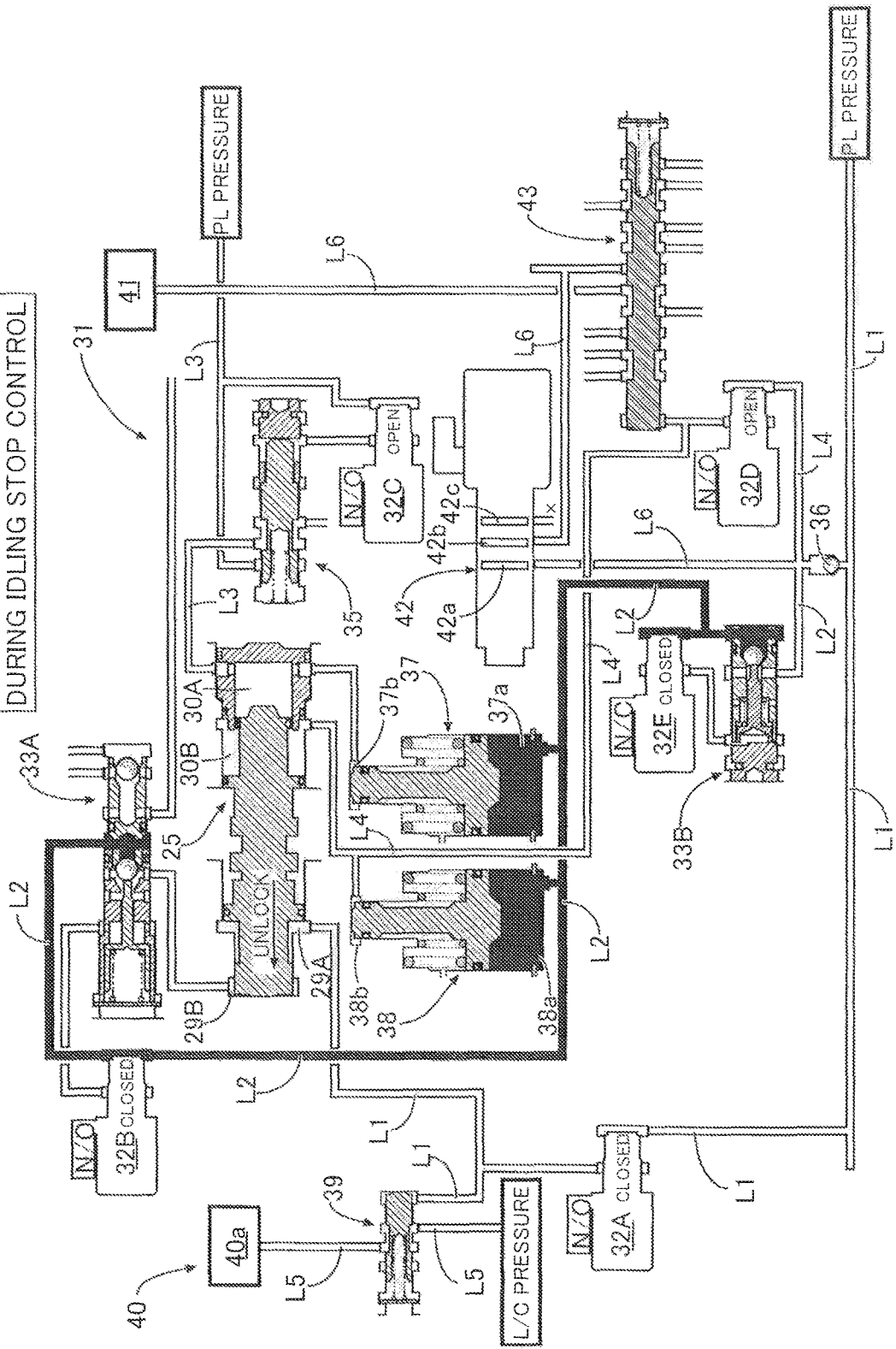
FIG. 6 is a diagram for explaining the operation at a time of idling stop control. (first embodiment)

The vehicle of the present embodiment can be subjected to idling stop control, and the line pressure disappears due to the engine E stopping at a time of a temporary stop such as when waiting for a traffic light. During this idling stop control, as shown in FIG. 6, the normally closed solenoid valve 32E is de-energized and closes, in response thereto the second ball valve 33B closes, and the hydraulic pressure stored under pressure in the first accumulator 37 and the second accumulator 38 is thereby retained without leakage. Furthermore, due to the line pressure disappearing, the hydraulic pressure of the first unlocking oil chamber 30A and the second unlocking oil chamber 30B of the hydraulic actuator 25 also disappears, and due to engagement between the detent plate 17 and the detent roller 22 the parking lock is maintained in the operation released state.

Since the line pressure does not immediately rise even when the engine starts when recovering from idling stop control, hydraulic pressure cannot be supplied to the hydraulic brake 41, which is a hydraulic engagement device necessary for starting, and there is a possibility that smooth starting will be inhibited. However, in accordance with the present embodiment, the hydraulic brake 41 can be operated without delay by the hydraulic pressure of the first accumulator 37 and the second accumulator 38 retained during idling stop control.

Figure 7:
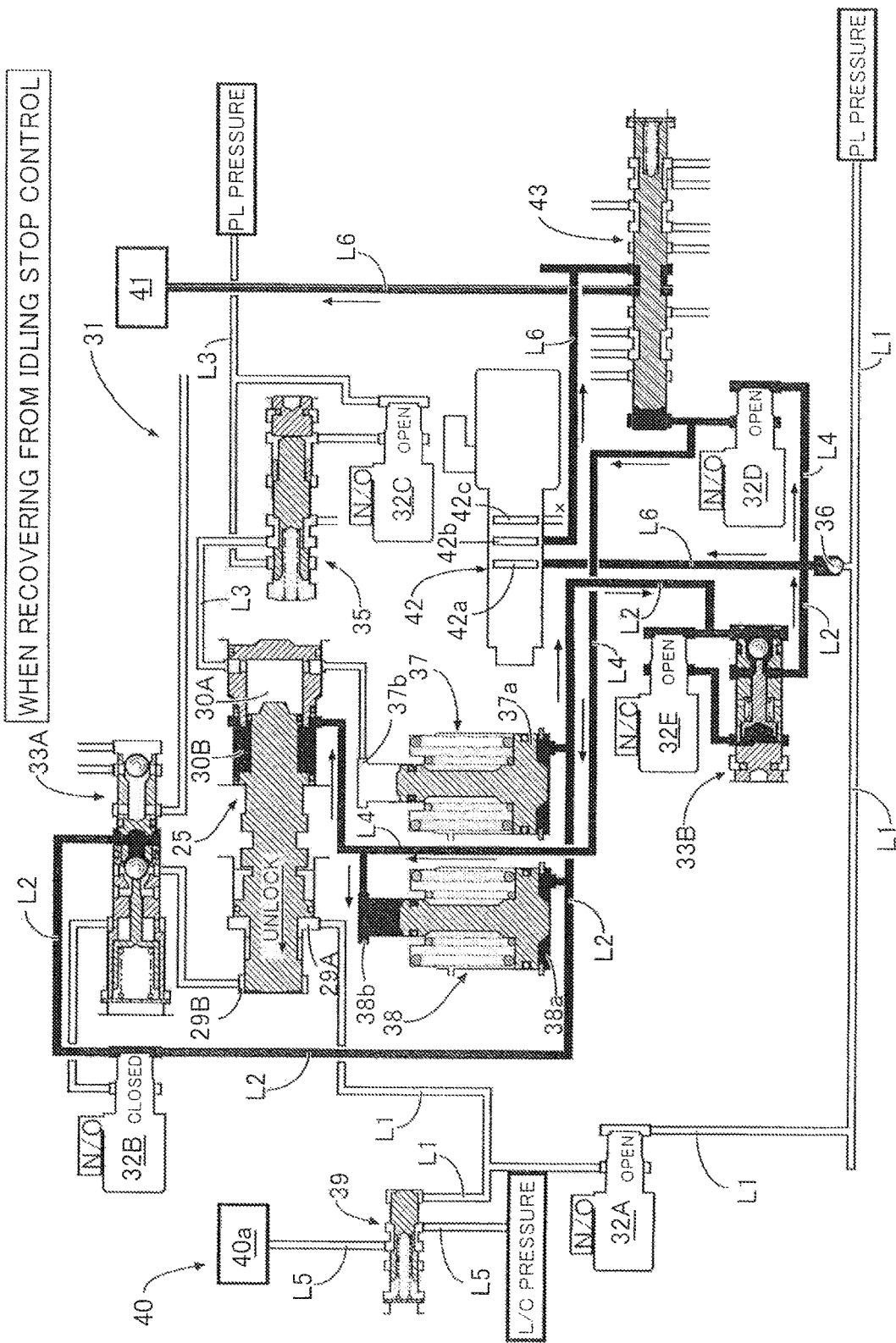
FIG. 7 is a diagram for explaining the operation when recovering from idling stop control. (first embodiment)

That is, as shown in FIG. 7, when the second ball valve 33B is opened by energizing and opening the solenoid valve 32E at the same time as recovering from idling stop control, the hydraulic pressure stored under pressure in the first accumulator 37 and the second accumulator 38 is transmitted from the oil passage L2 to the oil passage L4 and the oil passage L6 via the second ball valve 33B. In this arrangement, since the solenoid valve 32D disposed in the oil passage L4 is de-energized and open, the spool of the brake cut valve 43 moves rightward. Therefore, opening the linear solenoid valve 42 disposed in the oil passage L6 at a predetermined degree of opening enables the hydraulic pressure stored under pressure in the first accumulator 37 and the second accumulator 38 to be supplied to the hydraulic brake 41 and the vehicle to be started promptly.

Although the flow rate of oil that can pass through the solenoid valve 32E is relatively small, since the flow rate of oil that can pass through the second ball valve 33B, which is opened and closed by the solenoid valve 32E, is relatively large, it is possible by disposing the second ball valve 33B therebetween to enhance the responsiveness of supply of hydraulic pressure from the first accumulator 37 and the second accumulator 38, thereby enabling the hydraulic brake 41 to be promptly engaged.

In the explanation above, the operation of the hydraulic brake 41 when recovering from idling stop control is explained, but the hydraulic brake 41 can also be controlled during normal traveling of the vehicle by operating the brake cut valve 43 with the solenoid valve 32D. When the solenoid valve 32D is closed in order to move the spool of the brake cut valve 43 leftward to thus cut off communication between the linear solenoid valve 42 and the hydraulic brake 41, the supply of hydraulic pressure to the second unlocking oil chamber 30B of the hydraulic actuator 25 is cut off, but since the hydraulic actuator 25 is retained at an unlock position with the hydraulic pressure supplied to the first unlocking oil chamber 30A, there is no possibility that parking lock will be operated.

Furthermore, in accordance with the present embodiment, the solenoid valve 32A for operation of the hydraulic actuator 25 is also used for operation of the lockup clutch 40a of the torque converter 40. That is, since the solenoid valve 32A is closed when the vehicle is traveling as shown in FIG. 3, the spool of the lockup clutch shift valve 39 moves rightward, and the lockup clutch pressure is supplied to the lockup clutch 40a of the torque converter 40. When in this state the solenoid valve 32A is de-energized and opened, the spool of the lockup clutch shift valve 39 operates to drain the hydraulic pressure of the lockup clutch 40a, and the lockup clutch 40a can thereby be disengaged.

When the solenoid valve 32A is opened, the line pressure is supplied to the first locking oil chamber 29A of the hydraulic actuator 25, but since the line pressure is being supplied to both the first unlocking oil chamber 30A and the second unlocking oil chamber 30B at this point, even if the line pressure is supplied to the first locking oil chamber 29A, the piston 27 of the hydraulic actuator 25 does not move to the lock position, and there is no possibility that the parking lock will be operated.

As described above, in accordance with the present embodiment, since the solenoid valve 32A and the solenoid valve 32D, which control the operation of the hydraulic actuator 25, are also used for control of the lockup clutch 40a of the torque converter 40 and control of the hydraulic brake 41 respectively, it is possible to reduce the number of solenoid valves to thus simplify the structure of the hydraulic circuit 31 and, moreover, since the first accumulator 37 and the second accumulator 38 are used not only for operation of the parking lock but also for operation of the hydraulic brake 41, which is a hydraulic engagement device when recovering from idling stop control, it is possible to reduce the number of accumulators to thus further simplify the structure of the hydraulic circuit 31.

For example, when the vehicle is washed while moving it by pushing the vehicle body using a conveyor, it is necessary to release the parking lock in a state in which the engine is stopped. In the present embodiment, if in a state in which the shift lever is put into the P position the ignition is turned OFF and the engine is stopped, as explained in FIG. 4, the automatic parking lock is operated with the hydraulic pressure stored under pressure in the accumulators 37 and 38, but if in a state in which the shift lever is put into an N position the ignition is turned OFF and the engine is stopped, the hydraulic pressure stored under pressure in the accumulators 37 and 38 is automatically discharged, and automatic parking lock is not executed and is cancelled.

In this cancellation of the automatic parking lock, in a state in which the solenoid valve 32E is open and the linear solenoid valve 42 is fully open, the solenoid valve 32D is opened and closed at a predetermined time interval to thus discharge the hydraulic pressure of the first accumulator 37 and the second accumulator 38 from the brake cut valve 43 to a drain oil passage L7 (see FIG. 9), thereby preventing the hydraulic actuator 25 from operating to the lock position. Details of the operation thereof are explained below by reference to FIG. 8 to FIG. 10.

Figure 8:
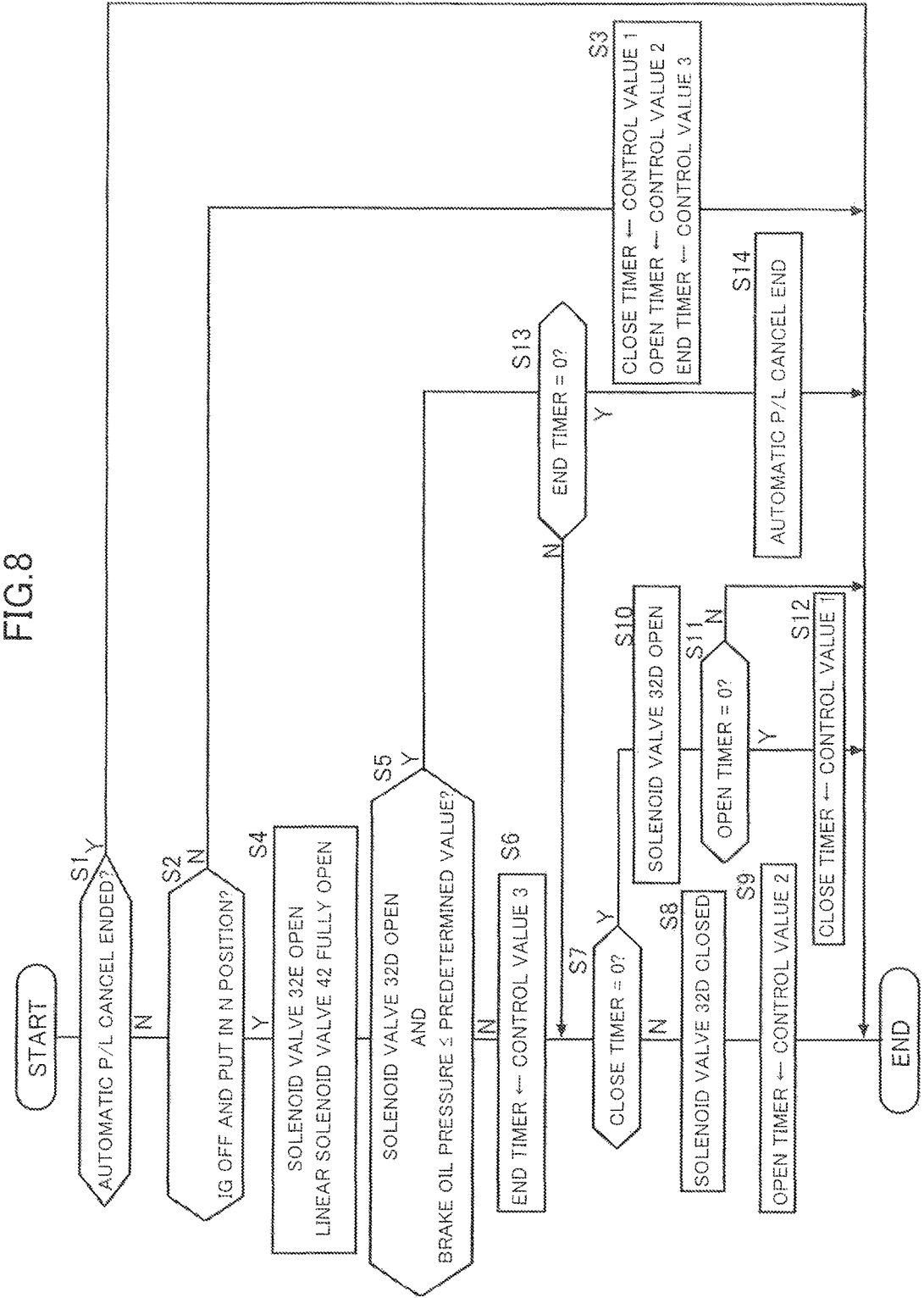
FIG. 8 is a flowchart showing a first procedure for canceling automatic parking lock. (first embodiment)

First, if in step S1 of the flowchart of FIG. 8 cancellation of the automatic parking lock is not completed, and in step S2 in an attempt to cancel the automatic parking lock the driver does not carry out an operation of turning the ignition OFF (engine stop) in a state in which the shift lever is put into the N position, then in step S3 the close timer is set at a control value 1, the open timer is set at a control value 2, and the end timer is set at a control value 3. The control value 1, the control value 2, and the control value 3 are for example 500 msec.

If in step S2 above in an attempt to cancel the automatic parking lock the driver carries out an operation of turning the ignition OFF (engine stop) in a state in which the shift lever is put into the N position, then in step S4 the solenoid valve 32E opens and the linear solenoid valve 42 fully opens, and discharge of the hydraulic pressure stored under pressure in the first accumulator 37 and the second accumulator 38 is executed. That is, if in step S5 the solenoid valve 32D is open and the hydraulic pressure of the hydraulic brake 41 is greater than a predetermined value (the set load of the first accumulator 37 and the second accumulator 38, for example, on the order of 100 kPa)), then it is determined that discharge of the hydraulic pressure of the first accumulator 37 and the second accumulator 38 is incomplete, and in step S6 the end timer is set at the control value 3.

If in the subsequent step S7 time is not up for the close timer for the solenoid valve 32D, which is at this time closed, then in step S8 the solenoid valve 32D remains closed and in step S9 the open timer is set at the control value 2. If in step S7 of the subsequent loop time is up for the close timer, then in step S10 the solenoid valve 32D is opened, in the subsequent step S11 the state is continued until time is up for the open timer, and when in step S11 time is up for the open timer, then in step S12 the close timer is set at the control value 1.

While repeating opening and closing of the solenoid valve 32D in this way, if in step S5 the solenoid valve 32D is open and the hydraulic pressure of the hydraulic brake 41 attains a predetermined value or below, it is determined that discharge of the hydraulic pressure of the first accumulator 37 and the second accumulator 38 is completed, and the procedure shifts to step S13. If in step S13 time is not up for the end timer, opening and closing of the solenoid valve 32D is further continued, and if time is up for the end timer, then in step S14 cancellation of the automatic parking lock is ended.

As described above, opening and closing control of the solenoid valve 32D is repeated at least until time is up for the end timer, as a result the hydraulic pressure of the hydraulic brake 41 (that is, the hydraulic pressure of the first accumulator 37 and the second accumulator 38) decreases to a predetermined value or below, and when there is no possibility that the hydraulic actuator 25 will operate the parking lock, cancellation of the automatic parking lock is ended.

Figure 9:
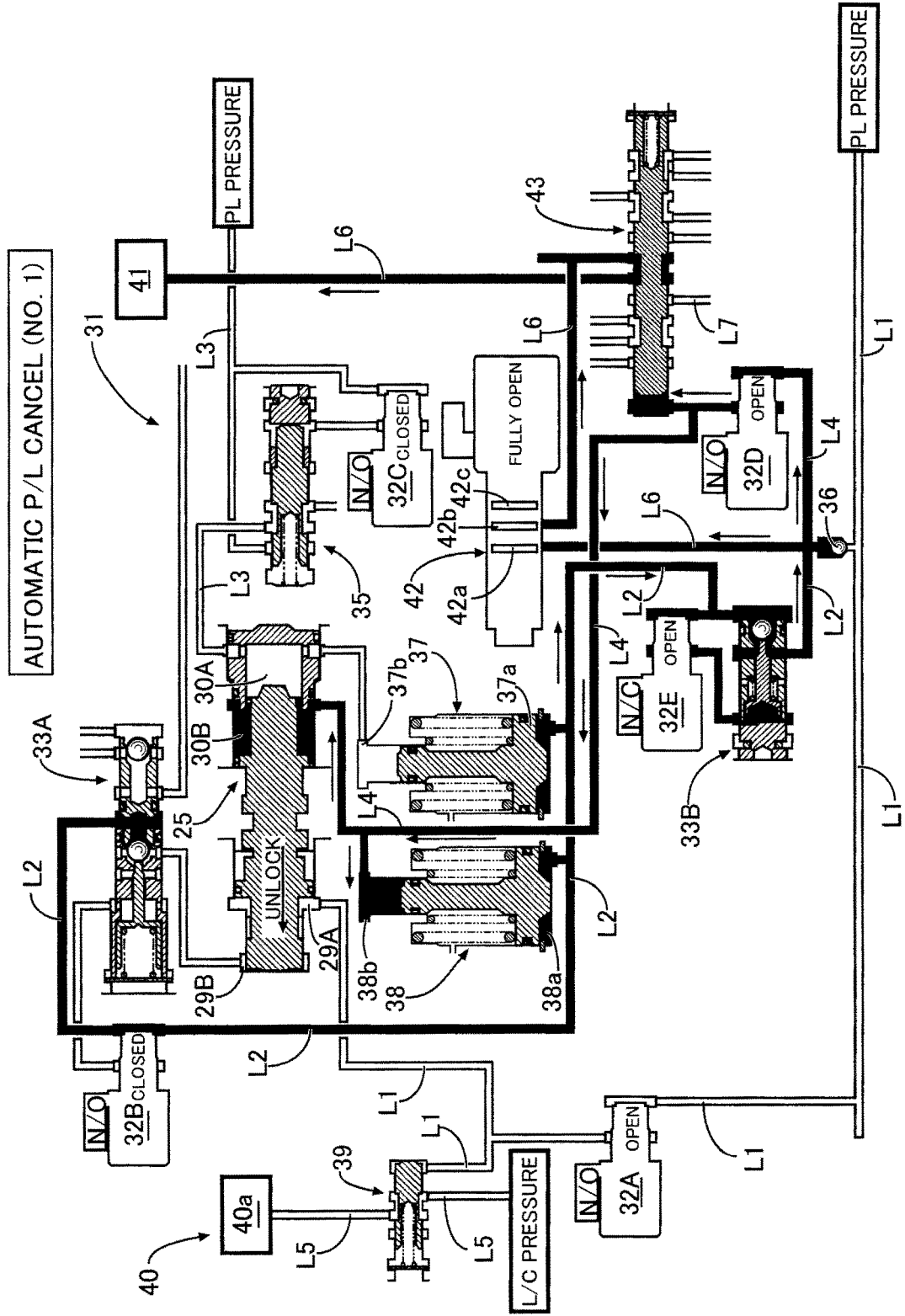
FIG. 9 is a diagram (No. 1) for explaining the operation of canceling automatic parking lock by the first procedure. (first embodiment)
Figure 10:
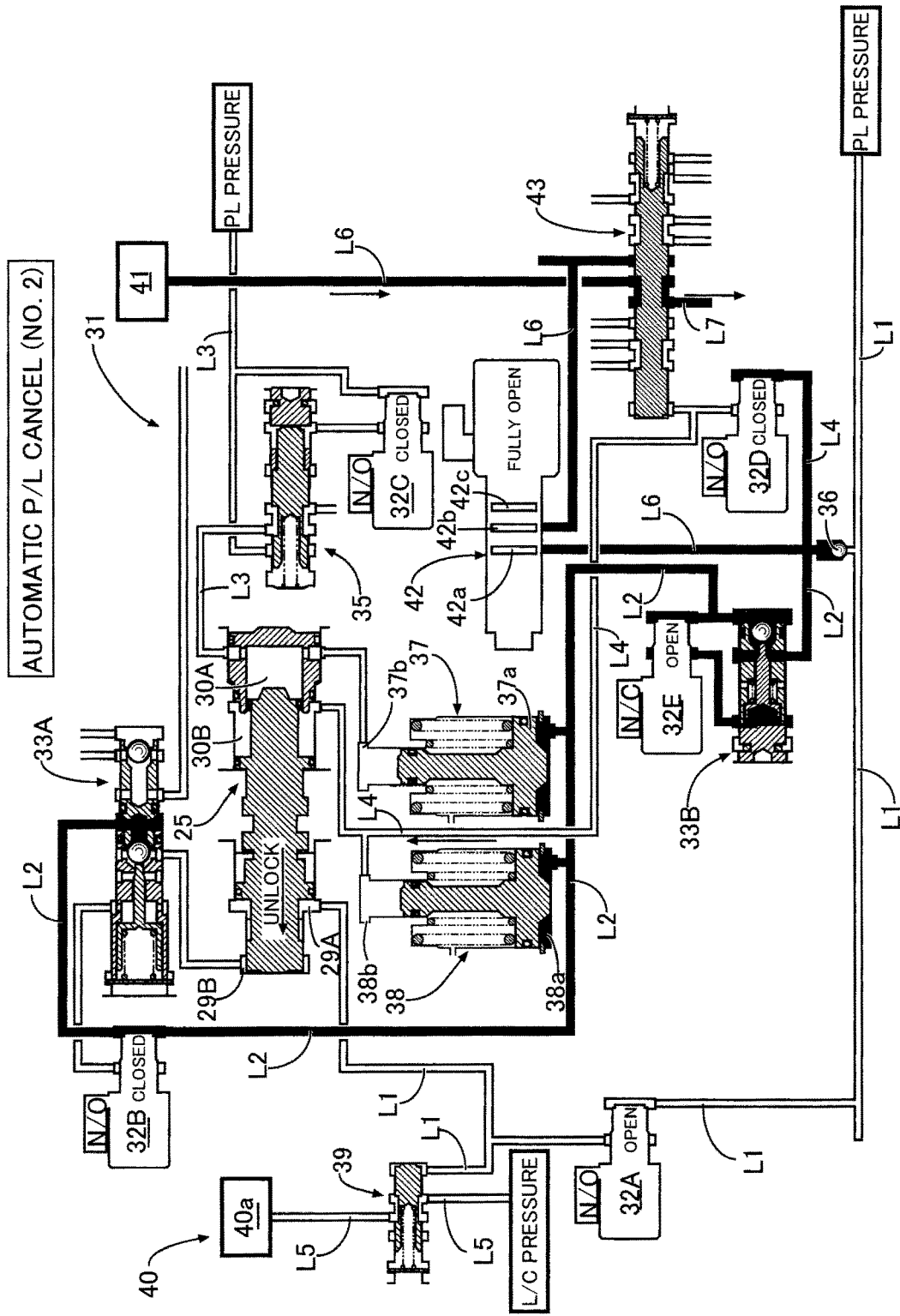
FIG. 10 is a diagram (No. 2) for explaining the operation of canceling automatic parking lock by the first procedure. (first embodiment)

FIG. 9 and FIG. 10 explain the reason why the hydraulic pressure of the first accumulator 37 and the second accumulator 38 is discharged by opening and closing the solenoid valve 32D. FIG. 9 shows a state in which the solenoid valve 32D is open, and at this time the solenoid valve 32E is open and the linear solenoid valve 42 is fully open. Due to the solenoid valve 32D being open the spool of the brake cut valve 43 moves rightward, and the oil of the first accumulator 37 and the second accumulator 38 is therefore charged into the oil chamber of the hydraulic brake 41 via the path: second ball valve 33B→linear solenoid valve 42→brake cut valve 43. Furthermore, the oil that has passes through the solenoid valve 32D is supplied to the second unlocking oil chamber 30B of the hydraulic actuator 25 and the back chamber 38b of the second accumulator 38, thus maintaining the hydraulic actuator 25 in an unlocked state and promoting discharge of the hydraulic pressure of the second accumulator 38.

FIG. 10 shows a state in which the solenoid valve 32D is closed; due to the solenoid valve 32D being closed the spool of the brake cut valve 43 moves leftward and provides a connection between the oil chamber of the hydraulic brake 41 and the drain oil passage L7, and the oil that has been charged into the oil chamber of the hydraulic brake 41 is therefore discharged from the drain oil passage L7. Therefore, the oil of the first accumulator 37 and the second accumulator 38 is charged into the oil chamber of the hydraulic brake 41 by the solenoid valve 32D being open and is discharged from the oil chamber of the hydraulic brake 41 to the drain oil passage L7 by the solenoid valve 32D being closed, and the hydraulic pressure of the first accumulator 37 and the second accumulator 38 is promptly discharged by repeating the above. Moreover, due to the hydraulic pressure being supplied to the back chamber 38b of the second accumulator 38, discharge of the hydraulic pressure of the second accumulator 38 is promoted.

Another method for canceling the automatic parking lock is now explained by reference to FIG. 11 and FIG. 12.

First, if in step S21 of the flowchart of FIG. 11 cancellation of the automatic parking lock has not ended, and in step S22 the driver does not carry out an operation of turning the ignition OFF (engine stop) in a state in which the shift lever is put into the N position in an attempt to cancel the automatic parking lock, then in step S23 the close timer is set at a control value 4. The control value 4 is for example 500 msec.

If in step S22 in an attempt to cancel the automatic parking lock the driver carries out an operation of turning the ignition OFF in a state in which the shift lever is put into the N position, then in step S24 the solenoid valve 32E is opened, a current that makes the amount of drainage the maximum is supplied from the linear solenoid valve 42, and the hydraulic pressure of the first accumulator 37 and the second accumulator 38 is thereby discharged from the linear solenoid valve 42 to a drain oil passage L8 (see FIG. 12). If in the subsequent step S25 the solenoid valve 32D is open and the hydraulic pressure of the hydraulic brake 41 has not attained a predetermined value or below, it is then determined that discharge of the first accumulator 37 and the second accumulator 38 is incomplete, and in step S26 the end timer is set at the control value 4.

Due to this loop being repeated, before long, if in step S25 the solenoid valve 32D is open and the hydraulic pressure of the hydraulic brake 41 attains a predetermined value or below, it is then determined that discharge of the hydraulic pressure of the first accumulator 37 and the second accumulator 38 is completed, and if in step S27 the state continues until time is up for the end timer, then in step S28 cancellation of the automatic parking lock is ended.

FIG. 12 explains the reason why the hydraulic pressure of the first accumulator 37 and the second accumulator 38 is discharged by the above procedure. In this process, the solenoid valve 32E is open, and the linear solenoid valve 42 is driven with the current that makes the amount of drainage the maximum and is made to communicate with the drain oil passage L8. Due to the solenoid valve 32E being open the oil of the first accumulator 37 and the second accumulator 38 is supplied to the linear solenoid valve 42 via the second ball valve 33B and is discharged from the linear solenoid valve 42 to the drain oil passage L8. In this case also, the oil that has passed through the solenoid valve 32D is supplied to the second unlocking oil chamber 30B of the hydraulic actuator 25 and the back chamber 38b of the second accumulator 38, the hydraulic actuator 25 is maintained in the unlocked state, and discharge of the hydraulic pressure of the second accumulator 38 is promoted.

As described above, discharging the hydraulic pressure of the first accumulator 37 and the second accumulator 38 in the procedure of FIG. 8 or FIG. 12 enables the operation of the automatic parking lock to be cancelled. If another method in which the hydraulic pressure of the first accumulator 37 and the second accumulator 38 is not discharged is employed, it is necessary to continue to supply the current from a battery to a solenoid valve in order to maintain the hydraulic pressure of the first accumulator 37 and the second accumulator 38, and there is a possibility that when the power of the battery is used up, the automatic parking lock will operate.

Turning the ignition OFF after the shift lever is put into the P range makes the automatic parking lock operate, and if the driver subsequently puts the shift lever into the N range within a predetermined time with the intention of releasing the parking lock, the parking lock that has been operated is released. The procedure thereof is explained below by reference to FIG. 13 and FIG. 14.

If in step S31 of the flowchart of FIG. 13 release of the automatic parking lock has not ended, in step S32 a predetermined time (for example, 15 minutes) has not elapsed after the driver has put the shift lever into the P position, and in step S33 the driver does not put the shift lever into the N position with the intention of releasing the parking lock after turning the ignition OFF and stopping the engine, then in step S34 the end timer is set at a control value 5 (for example, 500 msec).

If in step S33 the driver puts the shift lever into the N position with the intention of releasing the automatic parking lock, then in step S35 the solenoid valve 32E and the solenoid valve 32D open. As a result, if in step S36 the parking lock is not released, then in step S37 the end timer is set at the control value 5. If in step S36 the parking lock is released and in step S38 the end timer has counted up, then in step S39 release of the parking lock is ended.

When in step S35 the solenoid valve 32E and the solenoid valve 32D open, as shown in FIG. 14 the hydraulic pressure of the first accumulator 37 and the second accumulator 38 is supplied to the second unlocking oil chamber 30B of the hydraulic actuator 25 and the back chamber 38b of the second accumulator 38, the hydraulic actuator 25 is switched over to the unlocked state and the parking lock is released, and discharge of the hydraulic pressure of the second accumulator 38 is promoted.

Since the capacity of the first accumulator 37 and the second accumulator 38 is large, if a hydraulic pressure that can operate the automatic parking lock remains after releasing the parking lock, it is necessary to discharge the hydraulic pressure of the first accumulator 37 and the second accumulator 38 by the procedure shown in FIG. 8 or FIG. 12.

An embodiment of the present invention is explained above, but the present invention may be modified in a variety of ways as long as the modifications do not depart from the spirit and scope thereof.

For example, the hydraulic engagement device of the present invention is not limited to the hydraulic brake 41 of the embodiment and may be another hydraulic engagement device such as a hydraulic clutch.

The invention claimed is:

1. A vehicular parking lock device in which an automatic transmission that comprises a plurality of hydraulic engagement devices and changes a speed of a driving force from a drive source and outputs the driving force includes a hydraulic actuator that can restrain rotation of a parking gear connected to a wheel and a hydraulic circuit that controls operation of the hydraulic actuator, wherein
the hydraulic circuit comprises
a normally open first solenoid valve that supplies a line pressure from a hydraulic pressure supply source to an unlocking oil chamber at one end of the hydraulic actuator in order to drive the hydraulic actuator to a parking lock release position,
an accumulator in which a pressure is stored by the line pressure,
a normally open second solenoid valve that supplies a hydraulic pressure from the accumulator to a locking oil chamber at the other end of the hydraulic actuator in order to drive the hydraulic actuator to a parking lock operation position,
a linear solenoid valve that is connected to the hydraulic pressure supply source and the accumulator and regulates the line pressure, and
a switching valve that selectively connects the linear solenoid valve to any one of the plurality of hydraulic engagement devices or a drain oil passage,
the switching valve being operated by the first solenoid valve.

2. The vehicular parking lock device according to claim 1, wherein the unlocking oil chamber is connected to a back chamber of the accumulator.

3. The vehicular parking lock device according to claim 1, wherein when a driver stops the drive source after carrying out a parking lock release operation, the linear solenoid valve is opened, and the switching valve is operated by the first solenoid valve to thus connect the linear solenoid valve to the drain oil passage.

4. The vehicular parking lock device according to claim 1, wherein
the drive source is an engine that is subjected to idling stop control and there is provided a third solenoid valve disposed between the accumulator and the linear solenoid valve, and
the third solenoid valve connects the accumulator to the linear solenoid valve when the idling stop control is carried out and when a driver carries out a parking lock release operation after stopping the drive source.

5. The vehicular parking lock device according to claim 4, wherein when the driver stops the drive source after carrying out a parking lock release operation, the third solenoid valve and the linear solenoid valve are opened, and the first solenoid valve is opened and closed at a predetermined time interval.

6. The vehicular parking lock device according to claim 1, wherein
the drive source is an engine that is subjected to idling stop control and there is provided a third solenoid valve disposed between the accumulator and the linear solenoid valve, and
the third solenoid valve connects the accumulator to the linear solenoid valve when the idling stop control is carried out and when a driver carries out a parking lock release operation after stopping the drive source.

7. The vehicular parking lock device according to claim 4, wherein when the driver stops the drive source after carrying out a parking lock release operation, the third solenoid valve and the linear solenoid valve are opened, and the first solenoid valve is opened and closed at a predetermined time interval.

8. The vehicular parking lock device according to claim 2, wherein when a driver stops the drive source after carrying out a parking lock release operation, the linear solenoid valve is opened, and the switching valve is operated by the first solenoid valve to thus connect the linear solenoid valve to the drain oil passage.

9. The vehicular parking lock device according to claim 2, wherein
 the drive source is an engine that is subjected to idling stop control and there is provided a third solenoid valve disposed between the accumulator and the linear solenoid valve, and
 the third solenoid valve connects the accumulator to the linear solenoid valve when the idling stop control is carried out and when a driver carries out a parking lock release operation after stopping the drive source.

* * * * *